Patented Feb. 9, 1932

1,844,434

UNITED STATES PATENT OFFICE

BROUWER D. McINTYRE, OF MONROE, MICHIGAN

COMPOSITION BOARD AND METHOD OF MANUFACTURING THE SAME

No Drawing.   Application filed April 27, 1931.   Serial No. 533,361.

This invention relates to a composition sheet or board and to the method of manufacturing the same.

The invention has as one of its primary objects to produce a composition sheet or board having particularly efficient sound and vibration insulating characteristics.

Another object of the invention is to provide a composition board or sheet of this character produced principally from scrap material such as re-claimed rubber and/or tire casings and waste string, together with a sufficient amount of paper pulp to act as a binder to hold the other material together.

Another object of the invention is to provide a composition board or sheet of this character whose structure or texture is minutely cellular, the board being also compressibly resilient, and preferably relatively soft.

The objects and advantages of the invention are best obtained and largely the result of the general character or nature and substantially the relative portions of the material from which the composition board or sheet is produced.

As will appear from the following description, my improved composition board or sheet can be produced by the use of any of the standard wet machine processes now in use for the manufacture of binders board or other wet machine boards; by cylinder board machine processes, either single or multi-cylinder machines; by the Fourdrinier paper machine process, or by any known equivalent or variation of these well known machines and processes.

In producing my improved composition board I employ reclaimed rubber such as tire casings, tubes and the like; waste or reclaimed strings, burlap, rope, hemp, jute and the like; and waste paper stock.

Latex may be substituted for the reclaimed rubber or may form a part of the rubber constituent. Therefore, when reclaimed rubber is hereinafter referred to, it should be understood that this term includes latex.

For the fibrous constituent of the mixture, I may employ waste or reclaimed string, burlap, rope, hemp, jute or the like, and when the term waste string or string is hereinafter referred to, it will be understood that this term includes any of these aforementioned materials.

The term paper stock or waste paper stock, should be understood to also include chemical and/or mechanical wood pulp as well as waste paper stock.

In mixing the several ingredients or materials preparatory to manufacturing the composition board or sheet, I may employ approximately or substantially 50% by weight waste string; 25% by weight reclaimed rubber; and 25% by weight paper stock.

I may also use 50% by weight of reclaimed casings; 25% by weight of waste string; and 25% by weight of paper stock. When reclaimed casings are used as the rubber constituent, the amount of waste string employed may be correspondingly reduced because the reclaimed casings comprise rubber and fabric.

The formula may also be varied by employing 40% by weight of reclaimed casings; 40% by weight of scrap rags (refuse from a paper machine beater); and 20% by weight of paper stock. Moreover reclaimed rubber (other than casings) may be substituted for the first constituent of this formula.

To the above mixture there is added size and alum and if desired, coloring such as lamp black or any other desired color.

The material comprising the above formulas are preferably sized with rosin size, Stanco wax size or any combination of wax and rosin sizes, papermaker's alum being added to precipitate the size.

The mixture may be colored with direct, basic or acid dyes, or any other dyes manufactured for coloring of the paper fibres, as desired.

While the sizing material hereinbefore mentioned makes the materials water resisting, the mixture may be waterproofed by the addition of ground asphalt, emulsions of asphalt, coal tar pitch, etc.

Obviously the relative proportions hereinbefore given of certain of the constituents of the material from which my improved composition board is made may be varied without materially changing the characteristics of the product. Bearing in mind, however, that the proportions of the ingredients may be altered I will now give a formula with exact proportions of an admixture which has been successfully used in producing a composition board having the desirable characteristics of my invention.

The several constituents of the admixture and the relative proportions by weight are as follows:

900 lbs. waste string,
450 lbs. reclaimed rubber,
450 lbs. waste paper stock,
40 lbs. rosin,
60 lbs. alum,
72 lbs. lamp black.

The waste string or other material is ground up as is also the reclaimed rubber.

In preparing the material for use in a wet machine or any of the other aforementioned standard types of paper making machinery, the paper stock is introduced into a standard beater and the beater is operated to reduce the paper stock in the customary manner. Then the waste string constituent is added and the beater is adjusted so as to beat the mixture lightly which acts to mix up the waste string stock and paper stock without shortening the length of the pieces of string stock. Thereafter the beater is adjusted to act merely as a mixer and the reclaimed rubber stock is added and mixed with the remaining material.

The material is then conducted or conveyed in any of the well known ways to the paper making machinery which is to be employed and the boards or sheets are produced in accordance with one of the well known paper making processes.

During the process of manufacture the boards or sheets may be left unpressed or may be partly pressed (wet pressed). In some instances it may be desirable to calender the boards or sheets.

As heretofore mentioned, composition boards or sheets made in accordance with this invention have a minute cellular texture resulting probably principally from the fibrous constituent of the mixture. The boards are compressibly resilient, this characteristic resulting from the rubber constituent. The boards or sheets may be used to particular advantage as insulaton against sound, vibrations or the like. The sheets may also be used for heat and/or cold insulation and also to advantage as padding under floor covering and the like.

The boards or sheets may be economically produced because the principal ingredients are reclaimed or scrap material. The boards or sheets may be used to advantage in many other ways not at the present known and as a consequence not herein specifically enumerated.

Reservation is made to make such changes as may come within the purview of the accompanying claims.

What I claim as my invention is:

1. A composition board or sheet adapted for use as a sound insulating medium formed of fibrous material rubber and a waterproofing agent.

2. A composition board or sheet adapted for use as a sound insulating medium formed of waste string, reclaimed rubber, and paper stock.

3. A composition board or sheet of the character described formed of waste string, reclaimed rubber, waste paper stock, coloring material, sizing and alum.

4. A composition board or sheet of the character described formed of a fibrous material, rubber, and paper stock.

5. A composition board or sheet adapted for use as a sound insulating medium formed of waste string, reclaimed rubber, paper stock, a coloring agent, a sizing material, and papermaker's alum.

6. A composition board or sheet formed of waste string, reclaimed rubber, and paper stock, in substantially the proportions of 50% by weight of waste string, 25% by weight of reclaimed rubber, and 25% by weight of paper stock.

7. A composition board or sheet of the character described formed of material resulting from the admixture of approximately 900 pounds string, 450 pounds rubber, 450 pounds paper stock, 72 pounds coloring material, 60 pounds alum, and 40 pounds rosin.

8. The method of preparing material for the production of composition boards or sheets of the character described which comprises introducing paper stock in a beater and beating the same to thoroughly reduce and hydrate the paper stock; adding waste string to the mixture and beating the resulting mixture lightly to mix the string with the stock but insufficiently to materially shorten the length of the string content; and subsequently adding reclaimed rubber to the mixture and operating the beater to mix the rubber with the other materials.

9. A composition board or sheet of the character described formed of substantially 900 parts reclaimed string, 450 parts reclaimed rubber, 450 parts paper stock, 72 parts coloring agent, 60 parts alum, and 40 parts rosin.

10. As an article of manufacture, a composition board or sheet composed of string, rubber, and paper stock, and having a minute cellular texture, and being compressibly resilient.

11. As an article of manufacture, a composition board or sheet for use as insulation against sound, vibrations and the like, said board being formed of string, reclaimed rubber, and waste paper stock to form a minute cellular structure which is compressibly resilient.

12. As an article of manufacture, a composition board or sheet composed of 10% to 25% rubber, together with string, and paper.

13. As an article of manufacture, a composition board or sheet composed of from 25% to 50% rubber, together with string, and paper.

14. As an article of manufacture, a composition board or sheet composed of more than than 50% and less than 75% rubber, together with string, and paper.

15. A composition board or sheet adapted for use as a sound insulating medium formed of fibrous material, ground rubber, size and alum, and coloring.

16. A composition board or sheet adapted for use as a sound insulating medium formed of jute, ground rubber, size and alum, and coloring.

In testimony whereof I affix my signature.

BROUWER D. McINTYRE.

ber, and waste paper stock to form a minute cellular structure which is compressibly resilient.

12. As an article of manufacture, a composition board or sheet composed of 10% to 25% rubber, together with string, and paper.

13. As an article of manufacture, a composition board or sheet composed of from 25% to 50% rubber, together with string, and paper.

14. As an article of manufacture, a composition board or sheet composed of more than than 50% and less than 75% rubber, together with string, and paper.

15. A composition board or sheet adapted for use as a sound insulating medium formed of fibrous material, ground rubber, size and alum, and coloring.

16. A composition board or sheet adapted for use as a sound insulating medium formed of jute, ground rubber, size and alum, and colering.

In testimony whereof I affix my signature.

BROUWER D. McINTYRE.

DISCLAIMER 1,844,434.—*Brouwer D. McIntyre*, Monroe, Mich. COMPOSITION BOARD AND METHOD OF MANUFACTURING THE SAME. Patent dated February 9, 1932. Disclaimer filed January 24, 1933, by the assignee, *Insulation Development Corporation*.

Hereby enters the following disclaimer; to wit:

In the specification, page 1, lines 92 to 96, petitioner disclaims ground asphalt, emulsions of asphalt and coal tar pitch as a sizing or water resisting material except when these materials are introduced into the beater or mixer in a cold condition and in a ground or emulsified form and caused to commingle with the other materials of the mixture without the application of sufficient heat to melt or soften the asphalt or coal tar pitch in the beater or mixer.

Your petitioner also disclaims from the scope of claim 1 the use of ground asphalt, emulsions of asphalt and coal tar pitch as a water-proofing agent except when introduced into the other ingredients in a cold condition and in a ground or emulsified form and caused to commingle therewith in the mixer or beater without the application of heat sufficient to melt or soften the asphalt or coal tar pitch.

[*Official Gazette February 14, 1933.*]

DISCLAIMER 1,844,434.—*Brouwer D. McIntyre*, Monroe, Mich. COMPOSITION BOARD AND METHOD OF MANUFACTURING THE SAME. Patent dated February 9, 1932. Disclaimer filed January 24, 1933, by the assignee, *Insulation Development Corporation*.

Hereby enters the following disclaimer; to wit:

In the specification, page 1, lines 92 to 96, petitioner disclaims ground asphalt, emulsions of asphalt and coal tar pitch as a sizing or water resisting material except when these materials are introduced into the beater or mixer in a cold condition and in a ground or emulsified form and caused to commingle with the other materials of the mixture without the application of sufficient heat to melt or soften the asphalt or coal tar pitch in the beater or mixer.

Your petitioner also disclaims from the scope of claim 1 the use of ground asphalt, emulsions of asphalt and coal tar pitch as a water-proofing agent except when introduced into the other ingredients in a cold condition and in a ground or emulsified form and caused to commingle therewith in the mixer or beater without the application of heat sufficient to melt or soften the asphalt or coal tar pitch.

[*Official Gazette February 14, 1933.*]